United States Patent
Hsu

(10) Patent No.: US 8,374,430 B2
(45) Date of Patent: Feb. 12, 2013

(54) APPARATUS AND METHOD FOR FEATURE-BASED DYNAMIC CONTRAST ENHANCEMENT

(75) Inventor: Jeng-Yun Hsu, Hsin Chu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 456 days.

(21) Appl. No.: 12/726,681

(22) Filed: Mar. 18, 2010

(65) Prior Publication Data

US 2011/0013834 A1 Jan. 20, 2011

(30) Foreign Application Priority Data

Jul. 20, 2009 (TW) .............................. 98124364 A

(51) Int. Cl.
*G06K 9/00* (2006.01)
*H04N 5/14* (2006.01)
(52) U.S. Cl. ........................................ 382/168; 348/673
(58) Field of Classification Search .................. 382/168, 382/190, 192, 254, 266, 274, 276, 305, 312; 348/630–631, 672–673, 712–713
See application file for complete search history.

(56) References Cited

U.S. PATENT DOCUMENTS

| | | | | |
|---|---|---|---|---|
| 5,241,386 A | * | 8/1993 | Tsuji et al. | 348/607 |
| 5,748,773 A | * | 5/1998 | Tashiro et al. | 382/169 |
| 6,885,760 B2 | * | 4/2005 | Yamada et al. | 382/118 |
| 7,542,618 B2 | * | 6/2009 | Kang et al. | 382/254 |
| 7,672,008 B2 | * | 3/2010 | Yamazaki | 358/1.18 |
| 7,742,637 B2 | * | 6/2010 | Xiao et al. | 382/167 |
| 7,826,660 B2 | * | 11/2010 | Saquib et al. | 382/167 |
| 8,139,828 B2 | * | 3/2012 | Huo et al. | 382/128 |
| 8,159,616 B2 | * | 4/2012 | Norgaard | 348/672 |

* cited by examiner

*Primary Examiner* — Kanjibhai Patel
(74) *Attorney, Agent, or Firm* — Muncy, Geissler, Olds & Lowe, PLLC

(57) ABSTRACT

A feature-based contrast enhancement apparatus comprises a histogram calculator, a feature value calculator, a first combining circuit, a histogram equalizer and a remapper. By keeping the hardware cost as low as a picture-based contrast enhancement apparatus, the invention has an advantage of suppressing the background noise and enhancing the image details.

33 Claims, 11 Drawing Sheets

APPARATUS AND METHOD FOR FEATURE-BASED DYNAMIC CONTRAST ENHANCEMENT

This application claims the benefit of the filing date of Taiwan Application Ser. 098124364, filed on Jul. 20, 2009, the content of which is incorporated herein by reference.

BACKGROUND OF THE INVENTION

1. Field of the invention

The invention relates to image processing and, more particularly, to an apparatus and method for feature-based contrast enhancement.

2. Description of the Related Art

Throughout the specification and claims, the following terms take the meanings explicitly associated herein, unless the context clearly dictates otherwise. The term "luma" refers to the component of an input image data value that is correlated to the perceived intensity of a displayed data value. Wherein, the input image data itself may be analog/digital in nature and finally displayed on an analog/digital display such as a CRT/LCD. The term "chroma" refers to the component of the input image data value that is correlated to the perceived color of the displayed data value. Hue and saturation are two commonly used color perception that together define the chroma data. The term "dynamic contrast enhancement" refers to a dynamic adjustment of image luma contrast according to image luma level distribution (histogram).

In conventional dynamic contrast enhancement apparatus, the following three modes are widely used to perform contrast enhancement. The first is a picture-based mode. Contrast enhancement is performed based on a global histogram associated with a frame or a field. The background noise could be enhanced and the detailed features could be suppressed with respect to the processed images. The second is a region-based mode. A frame or a field is divided into multiple regions, and each region respectively has a region histogram. Contrast enhancement is performed by using one of the following two approaches. (1) Histogram equalization is performed for the corresponding region histogram of each region. The detailed features and the background noise could be enhanced simultaneously with respect to the processed images. (2) A global histogram is generated by disregarding the regions having over-concentrated histograms and using the histograms of the rest regions. Its background noise could be effectively suppressed. The third is a picture-region-based mode, which combines methods of the picture-based mode and the region-based mode. Histogram equalization is performed according to a global histogram and then local enhancement is performed according to the corresponding region histogram of each region. Thus, the detailed features and the background noise could be enhanced simultaneously with respect to the processed images.

Although some contrast enhancement methods related to the region-based mode can avoid enhancing the background noise and further enhancing the detailed image features, high hardware cost and huge volume of computation will be the problems. For example, if each frame or each field is divided into M regions and each region histogram includes N bins, the hardware cost of one contrast enhancement apparatus operating in a region-based mode will be M times higher than that of another contrast enhancement apparatus operating in a picture-based mode.

Therefore, it is desirable to suppress the background noise and enhance the detailed image features without increasing the hardware cost.

On the other hand, contrast is generally defined as the ratio of the brightest pixel value to the darkest pixel value in an image. Many experimental results show that an S-shaped user transfer curve (suppressing dark pixel value and enhancing bright pixel value) can improve the human perceptions of image contrast. According to the above definition, the S-shaped user transfer curve having characteristics of suppressing dark pixel value and enhancing bright pixel value indeed increases the contrast ratio. FIG. 1 shows an example of a dark scene histogram, a dark scene transfer curve, an S-shaped user transfer curve and a final transfer curve. For most of dark scene images, at first, a conventional contrast enhancement apparatus performs proper stretching on the dark scene transfer curve. Accordingly, as shown in FIG. 1, the yout values of the dark scene transfer curve are slightly greater than those of the 45-degree dotted line (having a slope equal to one). After that, the conventional dynamic contrast enhancement apparatus adjusts the dark scene transfer curve according to the S-shaped user transfer curve, or directly combines the dark scene transfer curve with the S-shaped user transfer curve to generate a final transfer curve. As can be observed from FIG. 1, the S-shaped user transfer curve counteracts the effect of the brightness stretching of the dark scene transfer curve, making the final transfer curve approximate to a 45-degree line. In other words, conventional dynamic contrast enhancement apparatus made vain attempts to perform contrast enhancement for the dark scene images.

SUMMARY OF THE INVENTION

One objective of the invention is to provide an apparatus and method for feature-based contrast enhancement to solve the above mentioned problems.

One objective of the invention is to provide an apparatus for feature-based contrast enhancement, which can effectively suppress the background noise and enhance image detailed features even though its hardware cost is as low as a conventional contrast enhancement apparatus operating in a picture-based mode.

In order to achieve the above objectives, the invention provides a dynamic contrast enhancement apparatus, comprising: a histogram calculator for receiving an input image to generate a luma histogram, wherein the input image includes a plurality of pixels; a feature value calculator for generating a feature histogram according to the high frequency components of all the pixels of the input image and a first relation curve; a first combining unit coupled to the histogram calculator and the feature value calculator for combining the luma histogram with the feature histogram to generate a combined histogram according to the sum of feature values of the feature histogram and a second relation curve; a histogram equalizer for receiving the combined histogram, performing contrast adjustment and generating a equalized transfer curve; and, a remapper for remapping the input image to generate a contrast enhanced image according to a final transfer curve.

Another object of the invention is to provide a dynamic contrast enhancement method, comprising: calculating a luma histogram of an input image, wherein the input image includes a plurality of pixels; obtaining a feature histogram according to the high frequency components of all the pixels of the input image and a first relation curve; combining the luma histogram with the feature histogram to obtain a combined histogram according to the sum of feature values of the feature histogram and a second relation curve; performing contrast adjustment on the combined histogram to obtain a equalized transfer curve; and, remapping the input image to generate a contrast enhanced image according to a final transfer curve.

Another object of the invention is to provide a device, comprising: a histogram calculator for receiving an input image to generate a luma histogram, wherein the input image includes a plurality of pixels; a histogram calculator for receiving an input image to generate a luma histogram, wherein the input image includes a plurality of pixels; a feature value calculator for generating a feature histogram according to the high frequency components of all the pixels of the input image and a first relation curve; and, a first combining unit for combining the luma histogram with the feature histogram to generate a combined histogram according to the sum of feature values of the feature histogram and a second relation curve.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

The input image of a feature-based contrast enhancement apparatus of the invention can be a frame or a field. The following embodiments will be all described in terms of frames.

Figure 2:
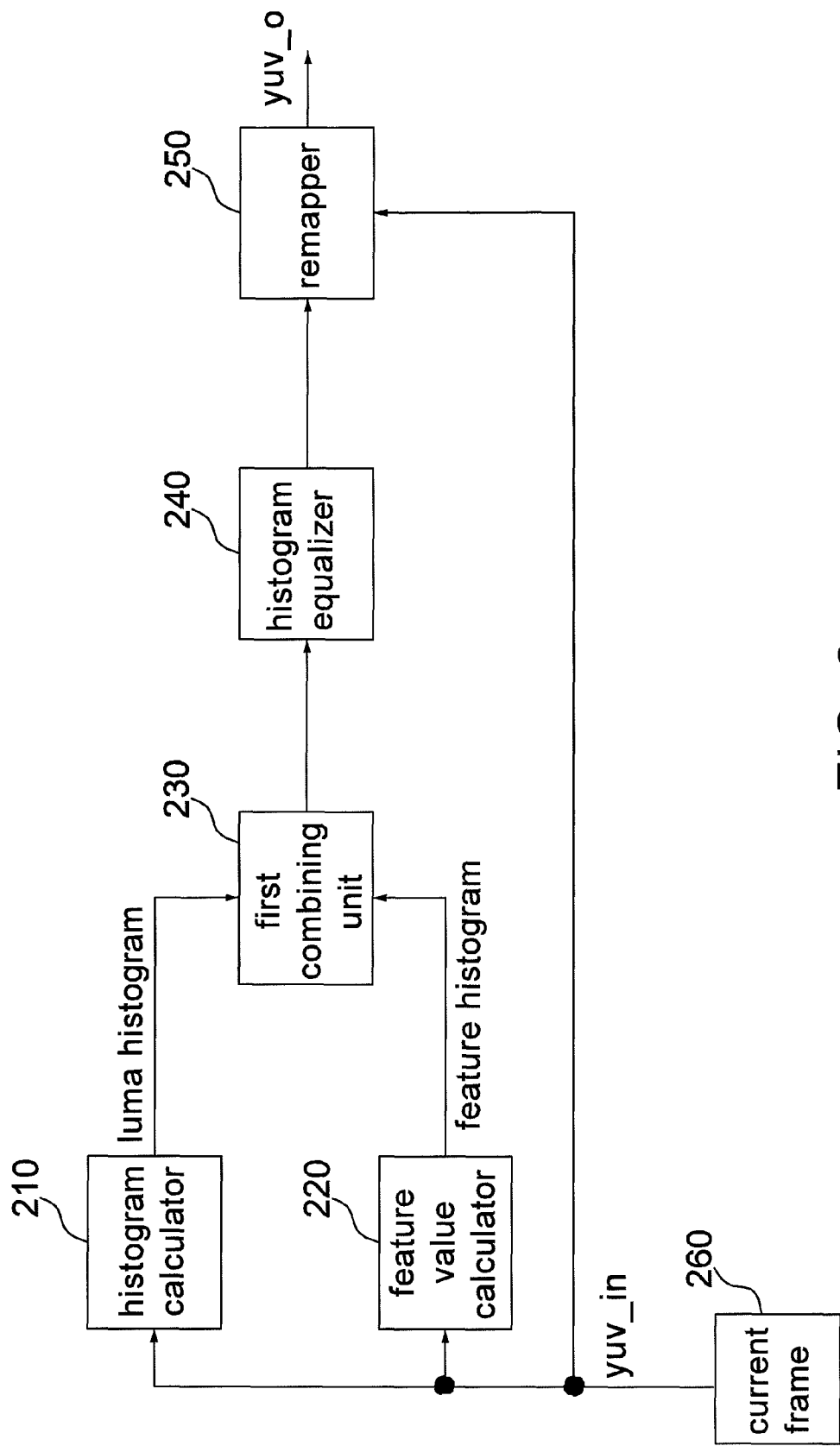
FIG. 2 is a block diagram of a feature-based contrast enhancement apparatus according to a first embodiment of the invention.

FIG. 2 is a block diagram of a feature-based contrast enhancement apparatus according to a first embodiment of the invention. Referring to FIG. 2, a feature-based contrast enhancement apparatus 200 of the invention comprises a histogram calculator 210, a feature value calculator 220, a first combining unit 230, a histogram equalizer 240, and a remapper 250. Referring to FIG. 2, a current frame 260 includes a plurality of pixels and each pixel (yuv_in) includes a luma component and a chroma component. After receiving the luma components (or data) of all the pixels of the current frame 260, the histogram calculator 210 calculates a luma histogram for the current frame 260.

Figure 3B:
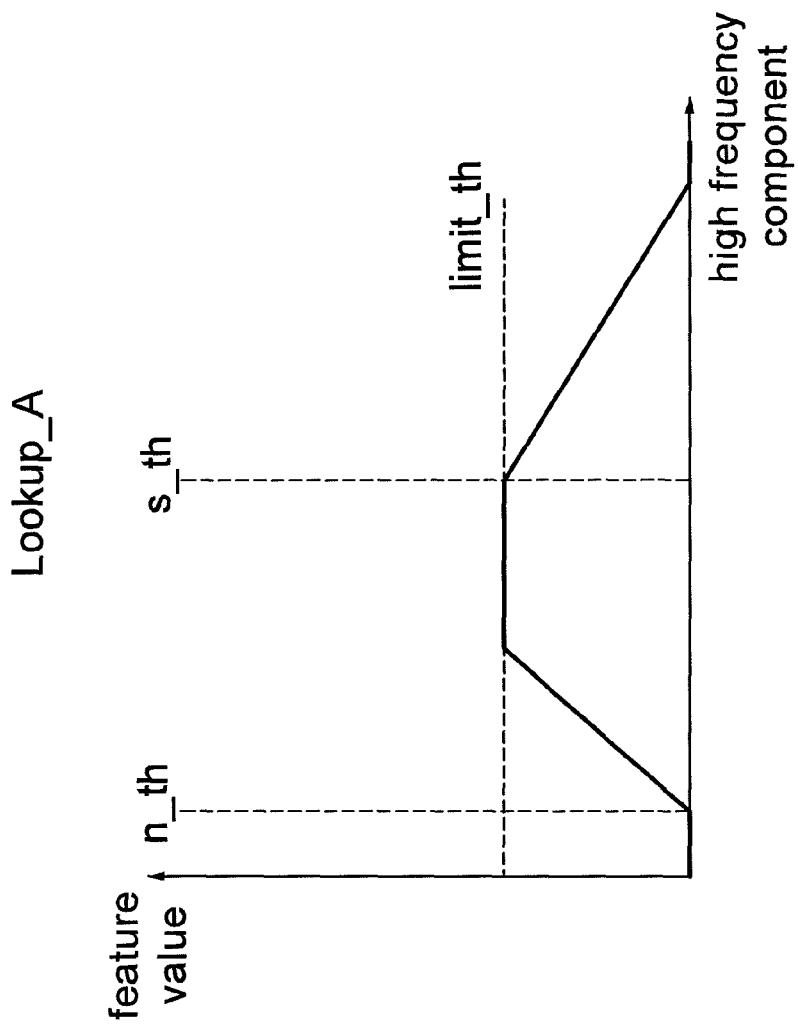
FIG. 3B shows a first relation curve between a high frequency component and a feature value.
Figure 3A:
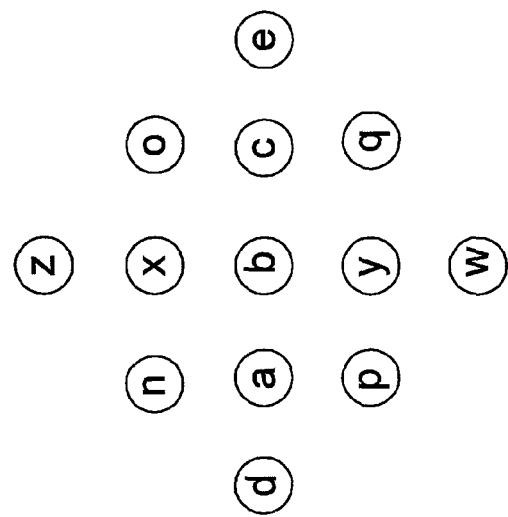
FIG. 3A is a diagram showing a target pixel and its neighboring pixels.

FIG. 3A is a diagram showing a target pixel and its neighboring pixels. Referring to FIG. 3A, the simplest method to determine the differences or features between the target pixel b and its neighboring pixels is to perform high-pass filtering on the pixels in the neighborhood of the target pixel b to quantify the differences between the target pixel b and its neighboring pixels. In an embodiment, the following program codes are provided in the feature value calculator 220 to perform high-pass filtering in horizontal direction and vertical direction respectively.

```
h_detail=abs(2 × b-a-c);
/*obtain a high frequency component h_detail in horizontal direction */
v_detail=abs(2 × b-x-y);
/*obtain a high frequency component v_detail in vertical direction */
```

The above-mentioned embodiment performs high-pass filtering on the target pixel b and its four neighboring pixels (a, c, x, y). It should be noted that the neighborhood of the target pixel b is not limited to the shape of a cross. For example, the neighborhood of the target pixel b can be in the shape of a diamond, i.e., including the target pixel b and its neighboring pixels (a, c, x, y, d, e, w, z, n, o, p, q). It should be understood, however, that the invention is not limited to these particular high-pass filtering operations described above, but fully extensible to any existing one-dimension or two-dimension high-pass filters (or filtering operations), or to yet-to-be developed high-pass filters (or filtering operations).

After receiving the high frequency component (h_detail or v_detail), the feature value calculator 220 obtains the feature value (h_detail' or v_detail') according to a first relation curve (Lookup_A) in FIG. 3B. The feature value is given by h_detail'=Lookup_A(h_detail);
v_detail'=Lookup_A(v_detail).

As can be observed from FIG. 3B, when a high frequency component (h_detail or v_detail) is less than n_th, since the level of the high frequency component is very low, the high frequency component is regarded as noise and containing no image information; thus, its corresponding feature value (h_detail' or v_detail') is set to 0. When a high frequency component is greater than n_th and less than s_th, the high frequency component is regarded as containing proper image information; thus, its corresponding feature value is set to be approximately proportional to the high frequency component but below a maximum value limit_th. When a high frequency component is greater than s_th, the high frequency component is regarded as containing excessive image information; thus, its corresponding feature value is set to be inversely proportional to the high frequency component.

The following embodiments are all described in connection with a luma histogram having 256 grayscale levels and 16 bins (from bin(0) to bin(15)), but the invention is not limited to the particular luma histogram.

The current frame 260 sequentially sends scan lines to the histogram calculator 210 and feature value calculator 220. Since a luma histogram includes 16 bins (from bin(0) to bin(15)), the feature histogram generated by the feature value calculator 220 correspondingly includes 16 bins (from detail (0) to detail(15)). That is, bin(0) corresponds to detail(0), bin(1) corresponds to detail(1), . . . , and bin(15) corresponds to detail(15). According to the invention, bin(0) counts the number of pixels having each luma value in the range of 0 to 15 in the current frame 260, and detail(0) counts the corresponding feature values of the pixels belonging to bin(0). Bin(1) counts the number of the pixels having each luma value in the range of 16 to 31 in the current frame 260, and detail(1) counts the corresponding feature values of the pixels belonging to bin(1). Likewise, bin(2) to bin(15) and detail (2) to detail(15) operate in the same manner. In an embodiment, if a luma histogram includes 16 bins, the following program codes are provided in the histogram calculator 210 and the feature value calculator 220 to process the target pixel b and generate a luma histogram and a feature histogram.

```
idx= b>>4; /*since a luma histogram includes 16 bins, the luma
value of the target pixel b is firstly divided by 16*/
bin(idx)=bin(idx)+1; /*the histogram calculator 210 counts the
number of pixels in bin(idx)*/
detail(idx)= detail(idx)+limit(h_detail'+v_detail', max_th); . . . (1)
/*the feature value calculator 220 uses detail(idx) to count both the
horizontal feature value h_detail' and the vertical feature value
v_detail' of the target pixel b*/
```

Take a target pixel b having a luma value of 100 for example. Given that idx=100/16=6, the target pixel b is counted by bin(6) in the histogram calculator 210; meanwhile, the feature value of the target pixel b is counted by detail(6) in the feature value calculator 220. In equation (1), the function limit(h_detail'+v_detail', max_th) will output the sum of h_detail' and v_detail', if (h_detail'+v_detail')<=max_th; the function limit(h_detail'+v_detail', max_th) will output max_th, if (h_detail'+v_detail')>max_th. In an embodiment, the feature value calculator 220 uses detail (idx) to count one of a horizontal feature value h_detail' and a vertical feature value v_detail of the target pixel b. In an alternative embodiment, the feature value calculator 220 uses detail(idx) to count the maximum value out of the horizontal feature value h_detail' and the vertical feature value v_detail' of the target pixel b.

Moreover, the feature value calculator 220 is provided to enhance the favorite colors or/and suppress the disfavored colors. In an embodiment, the feature value calculator 220 calculates the hue and the saturation based on the chroma component (U, V) of each pixel, defines four color regions according to the hue and the saturation, and then gives different weights to the four color regions according to at least one preset favorite color or/and at least one preset disfavored color. It should be noted that the above function of enhancing the favorite colors or/and suppressing the disfavored colors is optional for the invention, depending on application needs. How to calculate the hue and the saturation according to the chroma component (U, V) of the target pixel and how to determine which color region the target pixel belongs to based on its hue and saturation are well known to those skilled in the art and thus will not be described herein. In an embodiment, if the favorite color is green and the disfavored color is blue, the following program codes are provided to enhance the green details and suppress the blue details in the feature value calculator 220.

```
If (green_region(b)==1)
    w= green_w;
else if (blue_region(b)==1)
    w= blue_w;
/*Determine which color the target pixel b is. Since the favorite color
is green and the disfavored color is blue, the weight green_w > 1 and
the weight blue_w < 1*/
idx=b>>4; /* since a luma histogram includes 16 bins, the luma value
of the target pixel b is divided by 16 */
detail(idx)=detail(idx)+limit((h detail'+v_detail') × w, max_th);
/*the feature value (h_detail'+v_detail') is multiplied by the weight w
to enhance the green color and suppress the blue color before being
counted by detail(idx)*/
```

Figure 4:
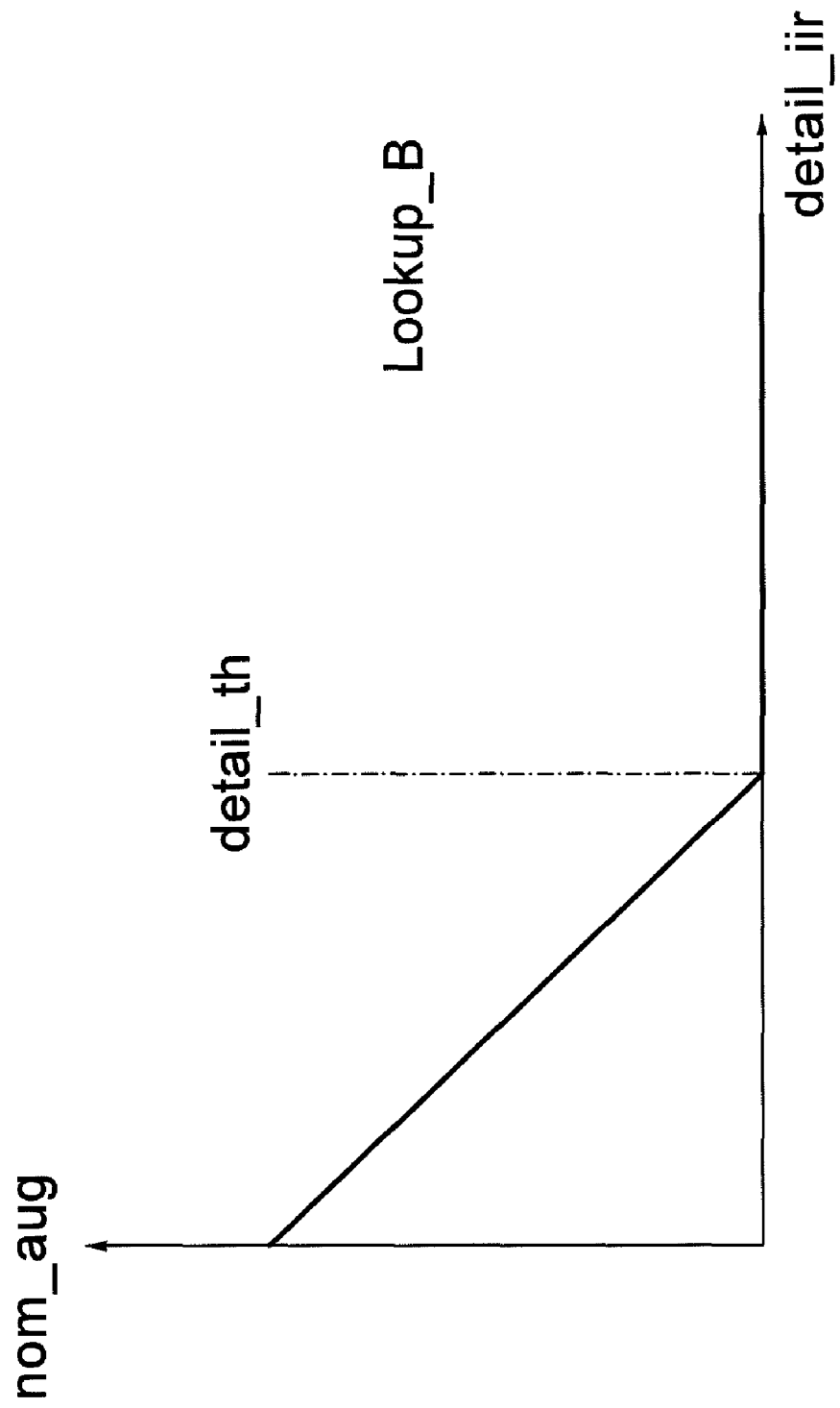
FIG. 4 shows a second relation curve between an inverse parameter (nom_aug) and a feature parameter (detail_iir).

FIG. 4 shows a second relation curve between an inverse parameter (nom_aug) and a feature parameter (detail_iir). After receiving the luma histogram and the feature histogram, the first combining unit 230 combines the luma histogram and the feature histogram to generate a combined histogram according to the second relation curve of FIG. 4. In an embodiment, the first combining unit 230 adds up the feature values of detail(0) to detail(15) to obtain a sum detail sum. Besides, the following mathematic equation (2) of infinite impulse response (IIR) is provided to average a feature parameter detail_iir (where α is a preset value and α<1) in order to avoid a huge difference between two sums (detail_sum) of feature values of two sequential frames.

$$detail\_iir = detail\_iir \times \alpha + detail\_sum(1-\alpha) \quad (2)$$

Thereafter, the first combining unit 230 uses the feature parameter detail_iir to obtain the inverse parameter non_aug according to the second relation curve of FIG. 4. As can be observed from FIG. 4, when detail_iir>detail_th, it indicates that the sum of feature values of the feature histogram is large enough and the feature histogram contains sufficient image information. Thus, the inverse parameter nom_aug is set to 0 to show the greater importance of the feature histogram than the luma histogram when the luma histogram and the feature histogram are combined. On the contrary, when detail_iir<detail_th, it indicates that the sum of feature values of the feature histogram is not large and the feature histogram contains insufficient image information. Thus, the feature parameter detail_iir is set to be inversely proportional to the inverse parameter nom_aug to show the less importance of the feature histogram than the luma histogram when the luma histogram and the feature histogram are combined. In an embodiment, assuming each of the luma histogram, the feature histogram and the combined histogram includes 16 bins respectively, the following program codes are provided to combine the luma histogram and the feature histogram to generate a combined histogram in the first combining unit 230.

```
nom_aug= round(Lookup_B(detail_iir));
/*The inverse parameter nom_aug is obtained according to detail_iir
and the second relation curve of FIG. 4*/
If (nom_aug > nom_aug_lp)
    nom_aug_lp= nom_aug_lp + 1;
else if (nom_aug < nom_aug_lp)
    nom_aug_lp= nom_aug_lp − 1;
/* the larger the parameter nom_aug_lp, the less image information
the feature histogram contains and the less important the feature
histogram becomes*/
n= nom + nom_aug_lp;
m= dem/8; /*nom, dem and m are programmable fixed
values*/
uniform_bin= total_pix >> 4; /* total _pix denotes the total
number of pixels in the current frame 260, and uniform_bin denotes
the average number of pixels in each bin according to the luma
histogram*/
if (n > nom_max) n=nom_max;
/*nom_max is a programmable fixed value and the n value cannot
be larger than nom_max */
for i= 0:15
    abin(i)= (detail(i) + bin(i) × n)/ (bin(i) + uniform_bin ×
        m); . . . (3)
    btotal= btotal + abin(i);
end
/*btotal denotes the total number of pixels contained in all the bins
(from abin(0) to abin(15)) of the combined histogram after combining
*/
for i= 0:15
    abin(i)= abin(i) × total_pix / btotal;
/*The combined histogram is normalized from btotal to total_pix */
End
```

The above equation (3) is provided to combine the luma histogram with the feature histogram. The magnitude of the n value determines the combining weights of the luma histogram and the feature histogram. The greater the n value, the greater the combining weight of the luma histogram. By contrast, the less the n value, the greater the combining weight of the feature histogram. The sum detail_sum of feature values of the feature histogram and the second relation curve of FIG. 4 are closely related to the magnitude of the n value. In addition, as can be observed from equation (3), assuming n=m=0, the bin of the combined histogram is given by abin(i)=detail(i)/bin(i), where i=0 to 15 and abin(i) indicates the feature value (or image information) per pixel. A special case is that when the number of pixels in a certain bin bin(i) of the luma histogram is too small (e.g., only 10 pixels), it is meaningless to perform contrast enhancement even though its corresponding bin detail(i) of the feature histogram has a large feature value. In practice, it is impossible to enhance the 10 pixels and suppress the other pixels. In order to overcome this problem, a term (uniform_bin×m) is used to avoid a too small denominator in equation (3).

According to the combined histogram generated by the first combining unit 230, the histogram equalizer 240 performs contrast adjustment and integral operations to generate an equalized transfer curve. It should be noted that the invention is not limited to the histogram equalizer performing a particular contrast adjustment method. Meanwhile, the implementation of the histogram equalizer is well known to those skilled in the art and thus will not be described herein. Finally, the remapper 250 remaps the current frame 260 to obtain a contrast enhanced frame according to the equalized transfer curve. In an embodiment, the remapper 250 receives the luma component yin of an input pixel value yuv_in and obtains its output luma value yout according to the equalized transfer curve. It should be noted that the remapper 250 directly outputs the chroma component (uv) of each input pixel without performing enhancement. Finally, with respect to each input pixel value yuv_in, the remapper 250 outputs its corresponding luminance value yout and its original chroma component (uv) as a corresponding output pixel value yuv_o.

Figure 5A:
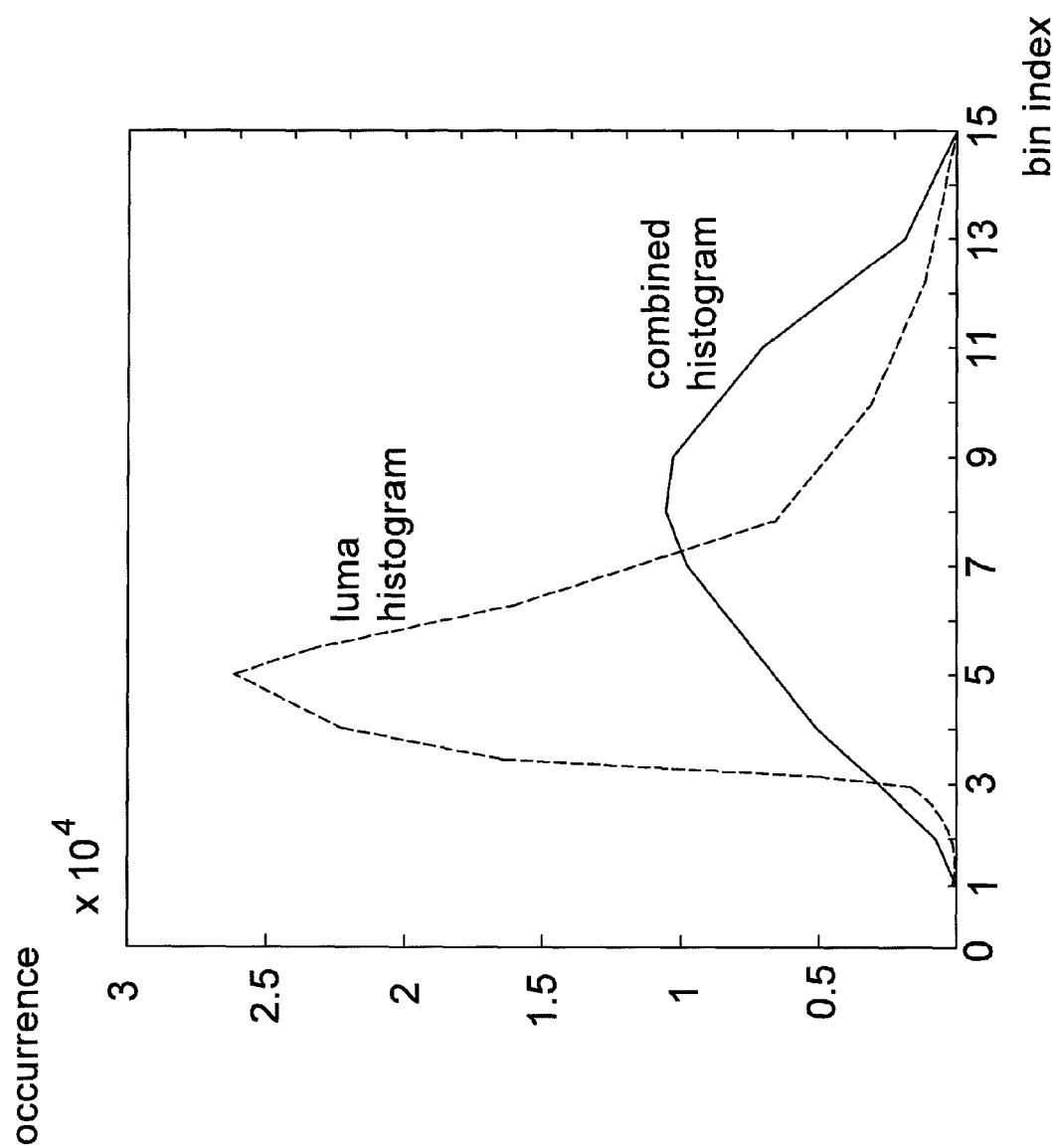
FIG. 5A is an example showing a luma histogram and a combined histogram according to the invention.
Figure 5B:
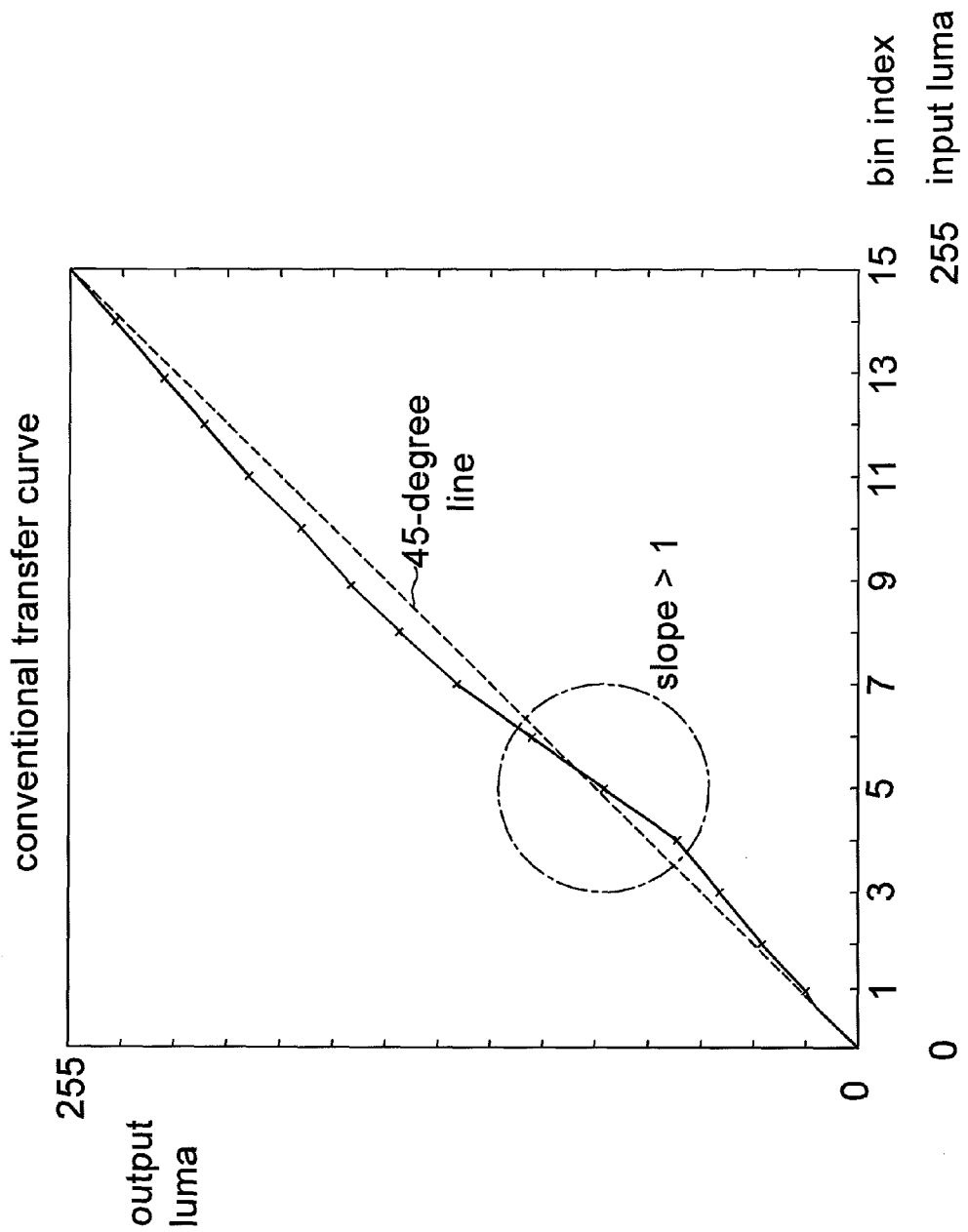
FIG. 5B shows a conventional transfer curve according to the luma histogram in FIG. 5A.
Figure 5C:
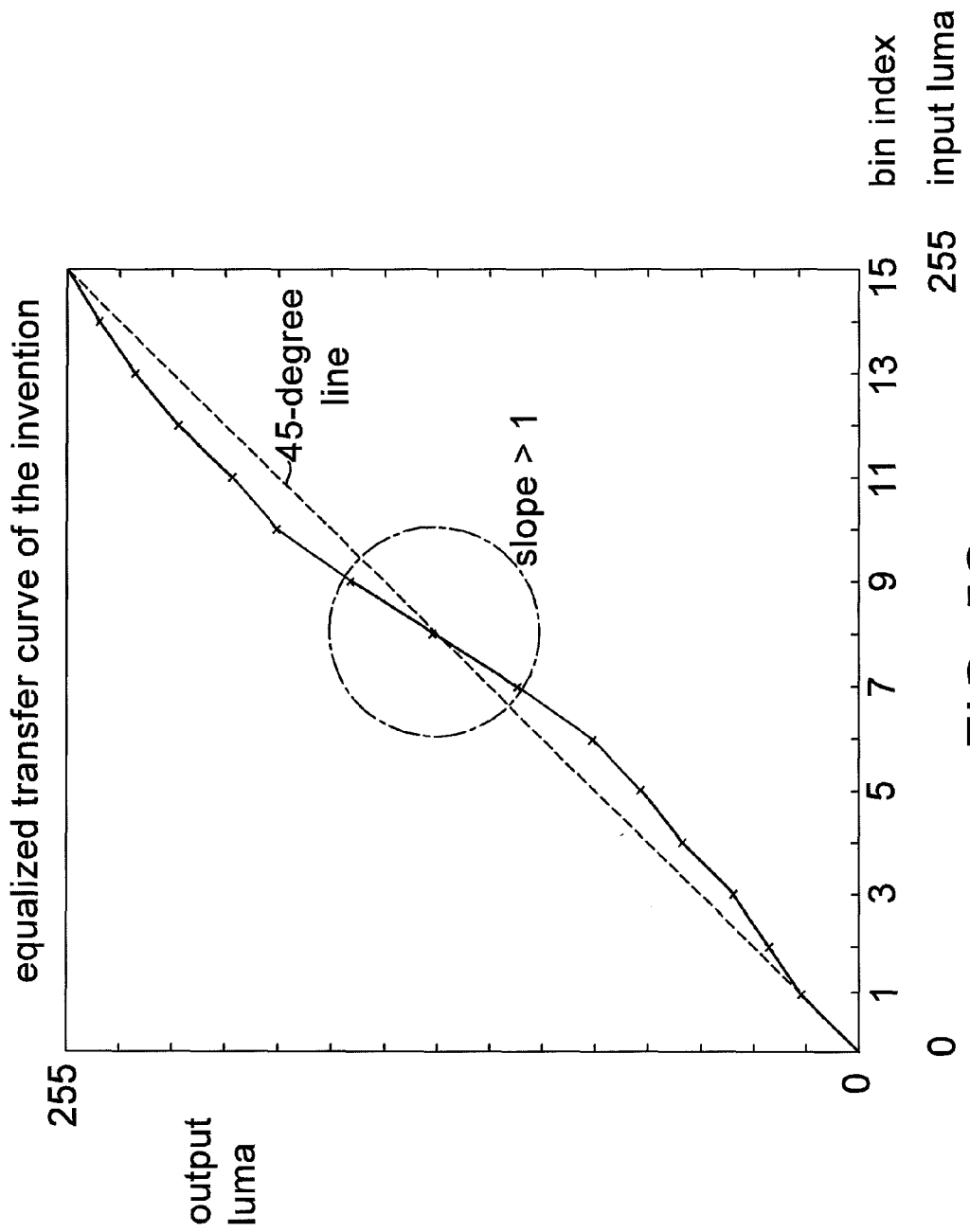
FIG. 5C shows an equalized transfer curve of the invention according to the combined histogram in FIG. 5A.

FIG. 5A is an example showing a luma histogram and a combined histogram according to the invention. FIG. 5B shows a conventional transfer curve according to the luma histogram in FIG. 5A. FIG. 5C shows an equalized transfer curve of the invention according to the combined histogram in FIG. 5A. For example, assuming that there is an exemplary image (not shown) showing a pencil laid on a uniform gray paper, FIG. 5A shows the luma histogram and the combined histogram of the exemplary image. The majority of the pixels are contained in bin(3) to bin(7) (the gray paper part) of the luma histogram while the majority of the pixels are contained in abin(6) to abin(10) (the pencil part) of the combined histogram. It indicates that the bins (bin(3) to bin(7)) of the luma histogram having the majority of the pixels and the bins (abin(6) to abin(10)) of the combined histogram having the majority information or image features do not necessarily correspond. Integral operations are respectively performed on the luma histogram in FIG. 5A to obtain the conventional transfer curve in FIG. 5B and on the combined histogram in FIG. 5A to obtain the equalized transfer curve of the invention in FIG. 5C. As can be observed from FIG. 5B, the conventional transfer curve is stretched out around bin(3) to bin(7) (slope>1, the gray paper part). However, it is meaningless to perform contrast enhancement on the gray paper part because there are little differences or image features on the uniform gray paper. On the contrary, there are more information or detailed image features contained in the pencil part rather than in the gray paper part. Thus, according to the invention, the equalized transfer curve of the invention is stretched out (slope>1) around abin(6) to abin(10), indicating the detailed image features of the pencil part are enhanced and the background noise of the gray paper part is suppressed.

Figure 6:
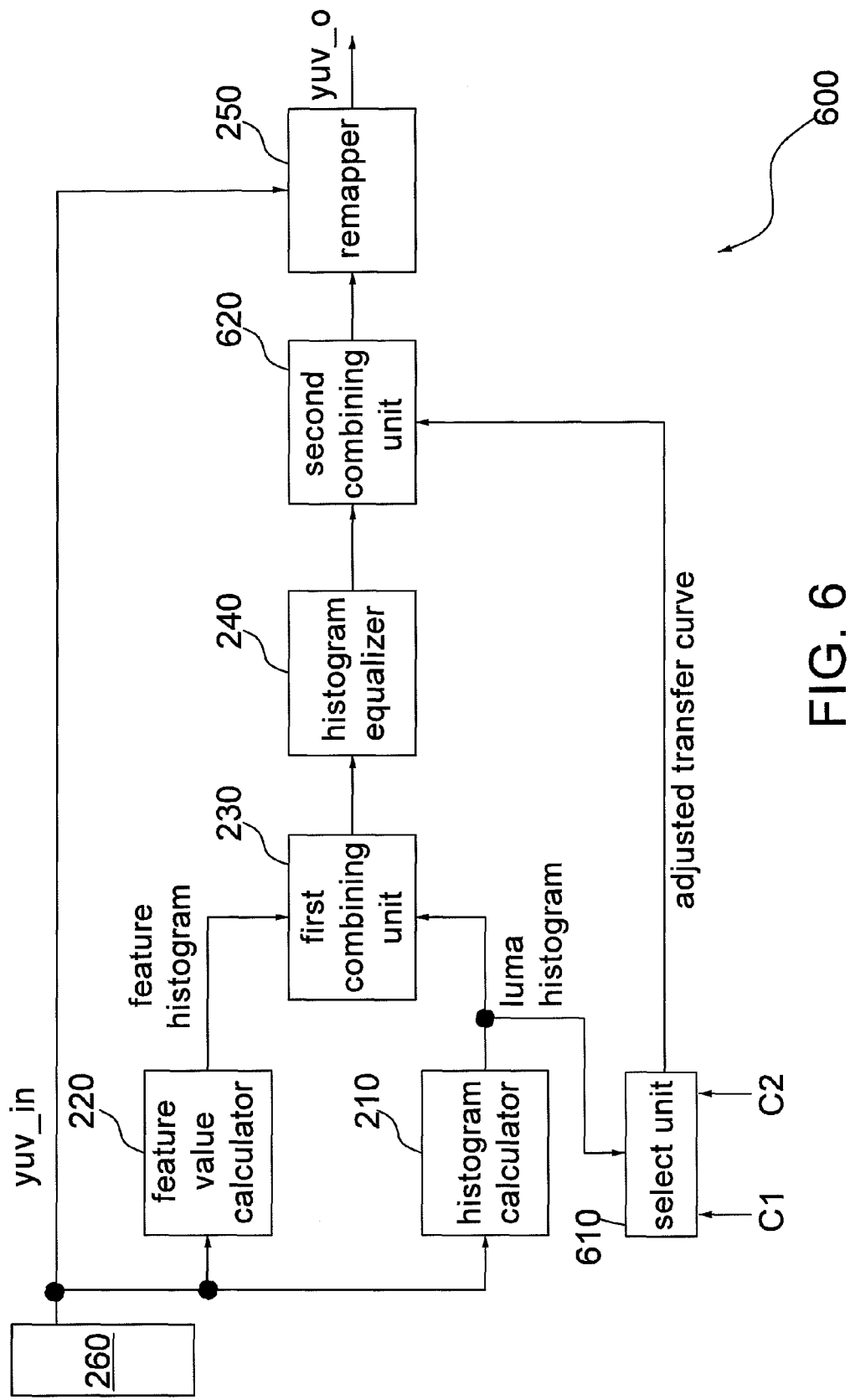
FIG. 6 is a block diagram of a feature-based contrast enhancement apparatus according to a second embodiment of the invention.

FIG. 6 is a block diagram of a feature-based contrast enhancement apparatus according to a second embodiment of the invention. Referring to FIG. 6, compared with the first embodiment, the feature-based contrast enhancement apparatus 600 of the second embodiment additionally includes a select unit 610 and a second combining unit 620. The same numerals are used for components identical to the first embodiment, and repeated description is omitted.

Figure 1:
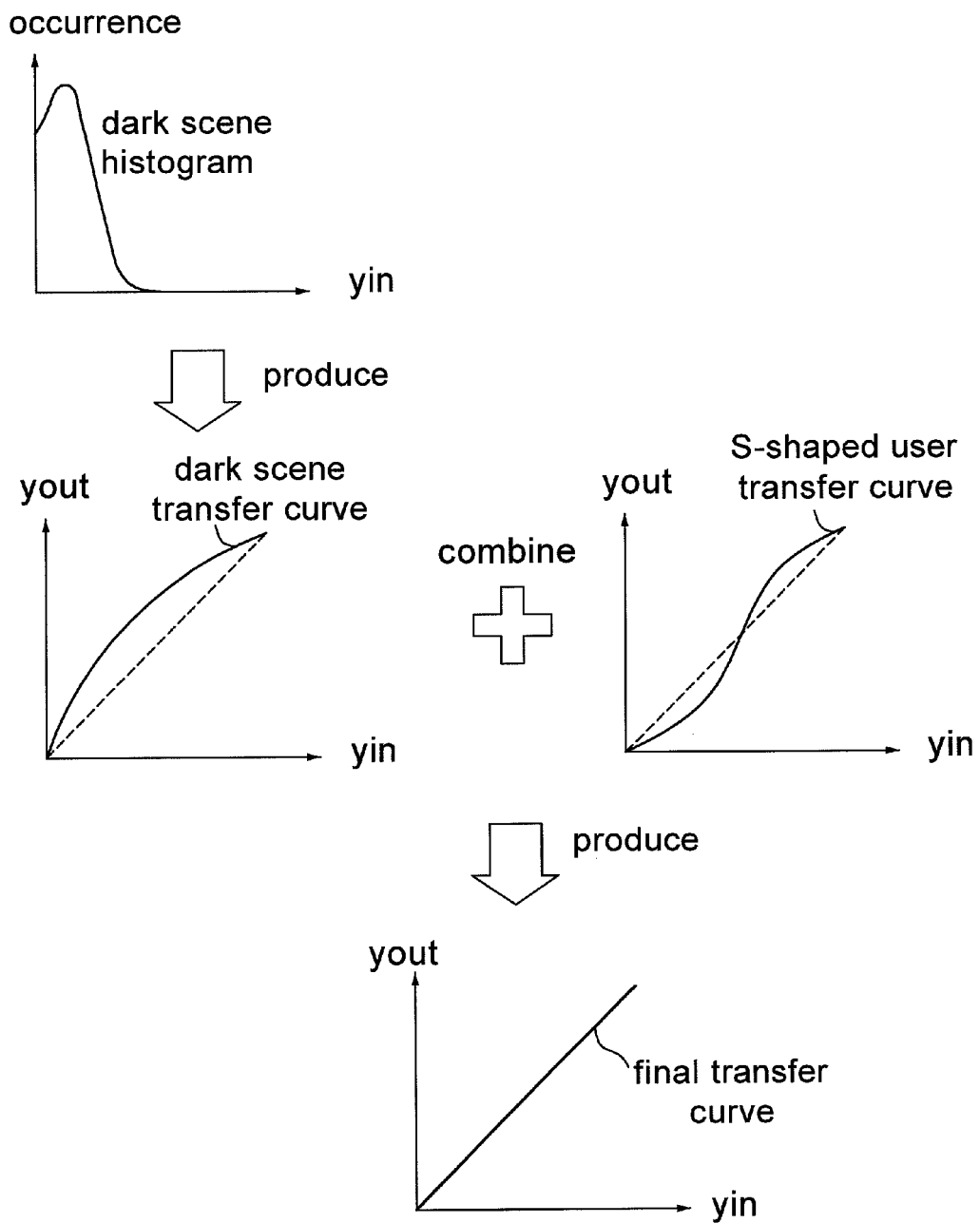
FIG. 1 shows an example of a dark scene histogram, a dark scene transfer curve, an S-shaped user transfer curve and a final transfer curve.

In the second embodiment, after receiving the luma histogram from the histogram calculator 210, the select unit 610 calculates the average luma value of all the pixels of the current frame 260 according to a dark scene transfer curve C1 and a S-shaped user transfer curve C2 (as the example in FIG. 1 but the invention is not limited to the example), and then decides whether the current frame 260 is a dark scene image according to the total number of pixels contained in at least one pre-determined bin at dark levels. If the current frame 260 is a dark scene image, the select unit 610 outputs the dark scene transfer curve C1 as an adjusted transfer curve; otherwise, the select unit 610 outputs the S-shaped user transfer curve C2 as the adjusted transfer curve. In an embodiment, in the select unit 610, the following program codes are provided to decide whether the current frame 260 is a dark scene image and output one of the dark scene transfer curve C1 and the S-shaped user transfer curve C2 as the adjusted transfer curve.

```
/* A parameter avg_y denotes an average luma value of all the pixels
of the current frame 260 */
```

$$\text{sum\_b} = \sum_{\text{start}}^{\text{end}} \text{bin}(i);$$

```
/* A parameter sum_b denotes the total number of
pixels of bin(start) to bin(end) in the luma histogram; a range of start
to end is pre-determined for the bins at dark levels and the range is
adjustable; the luma histogram includes 16 bins */
dark_y_th = 48; /*luma threshold value, adjustable */
dark_bin_th = total pixels × dark_ratio ;
/* A parameter dark_bin_th denotes the threshold number of pixels for
a dark scene image; a parameter total_pixels denotes the total
number of pixels of the current frame 260; a parameter dark_ratio is
a programmable fixed value and dark_ratio < 1; in an embodiment,
dark_ratio = 1/4 */
if (avg_y <= dark_y_th || sum_b >= dark_bin_th)
    for i = 0:15
        user_bin_mux(i) = user_bin_dark(i);                    (4)
    end
else
    for i = 0:15
        user_bin_mux(i) = user_bin_norm(i);                    (5)
    end
for i = 0:15
    user_bin(i) = (user_bin_mux(i) × alpha + user_bin(i) ×     (6)
        (64-alpha))/64;
end
/* The bins user_bin(0) to user_bin(15) are provided to form the
adjusted transfer curve; alpha is a programmable fixed value and
alpha < 1 */
```

According to the equations (4) and (5), when avg_y<dark_y_th, or sum_b>=dark_bin_th, it indicates the current frame 260 is a dark scene image. Therefore, the select unit 610 selects the dark scene transfer curve C1 as the adjusted transfer curve by setting user_bin_mux(i) to user_bin_dark(i). Otherwise, it indicates the current frame is not a dark scene image; accordingly, the select unit 610 selects the S-shaped user transfer curve C2 as the adjusted transfer curve by setting user_bin_mux(i) to user_bin_norm (i). Then, the select unit 610 uses the above mathematic IIR equation (6) to average the adjusted transfer curve bin by bin (from user_bin(0) to user_bin(15)) in order to avoid a huge difference between bins (user_bin(0) of the adjusted transfer curves of two sequential frames.

Thereafter, the second combining unit 620 combines the adjusted transfer curve from the select unit 610 and the equalized transfer curve from the histogram equalizer 240 to generate a final transfer curve. It should be noted that the invention is not limited to the second combining unit 620 performing a particular combining method. Meanwhile, the implementation of the second combining unit 620 is well known to those skilled in the art and thus will not be described herein. At last, the remapper 250 remaps the current frame 260 to obtain a contrast enhanced frame according to the final transfer curve.

Figure 7:
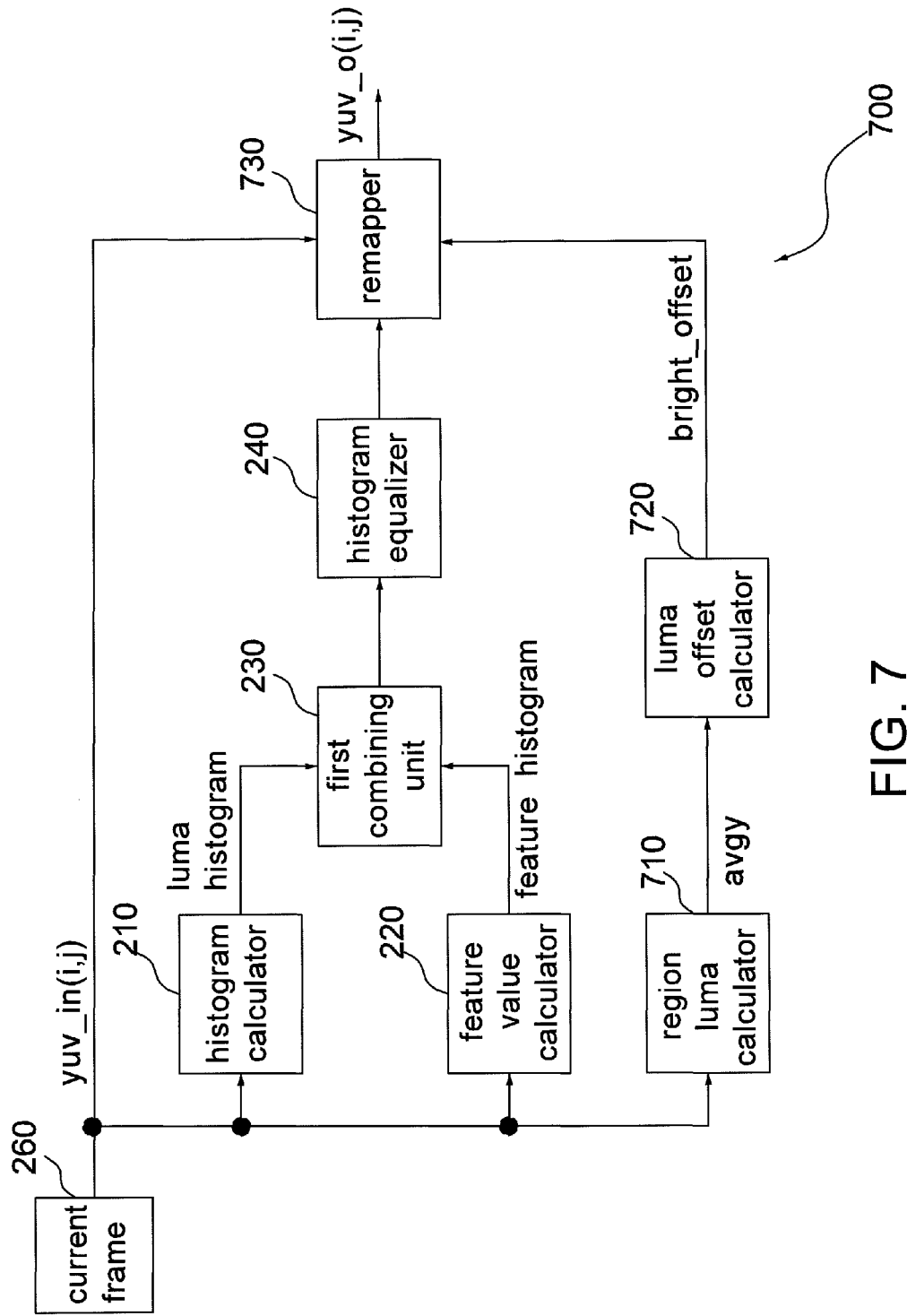
FIG. 7 is a block diagram of a feature-based contrast enhancement apparatus according to a third embodiment of the invention.

FIG. 7 is a block diagram of a feature-based contrast enhancement apparatus according to a third embodiment of the invention. Referring to FIG. 7, compared with the first embodiment, the feature-based contrast enhancement apparatus 700 of the third embodiment additionally includes a region luma calculator 710 and a luma offset calculator 720. The same numerals are used for components identical to the first and the second embodiments, and repeated description is omitted.

In the third embodiment, the region luma calculator 710 and the luma offset calculator 720 are provided to increase the brightness of dark level pixels to allow users to watch the dark level images more clearly. The functions of the region luma calculator 710 and the luma offset calculator 720 are optional to the invention, depending upon application needs.

Figure 8A:
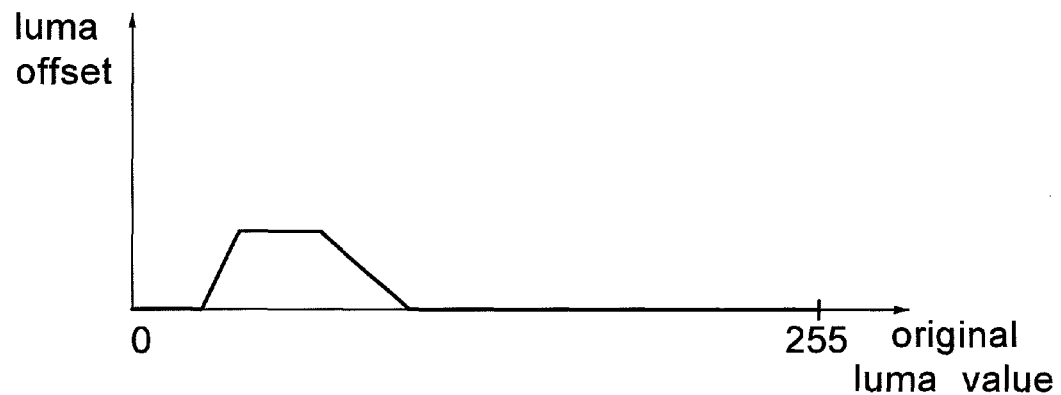
FIG. 8A shows a third relation curve between an original luma value and a luma offset.

FIG. 8A shows a third relation curve between an original luma value and a luma offset. Referring to FIG. 8A, a section of the third relation curve having several darkest luma levels (i.e., the left-hand side of the third relation curve) generally has a lower signal-to-noise ratio (SNR), so it is difficult to distinguish very low luma level signals from noises. Accordingly, it is not necessary to increase the brightness of the darkest section of the third relation curve. Besides, increasing the brightness of the darkest section of the third relation curve will reduce the contrast of the whole image. In practice, it should be noted that each of the first relation curve in FIG. 3, the second relation curve in FIG. 4 and the third relation curve in FIG. 8A can be implemented using a lookup table or a mathematic equation.

Figure 8B:
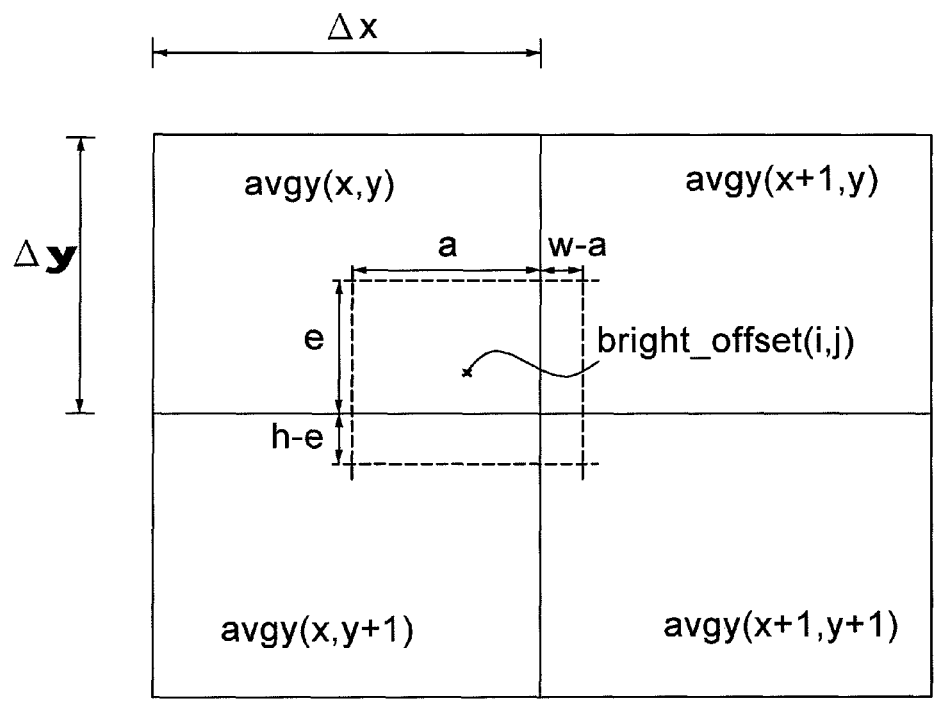
FIG. 8B shows a relationship between a calculating frame and its four neighboring regions.

The region luma calculator 710 first divides the current frame 260 into M×N regions to calculate the average luma value of each region, and then obtains a corresponding luma offset avgy(x,y) for each region according to the third relation curve in FIG. 8A, where 0<=x<=(M-1), 0<=y<=(N-1). According to the luma offset avgy(x,y) of each region and a pre-determined size of a calculating frame (e.g., a dotted line rectangle as shown in FIG. 8B), the luma offset calculator 720 calculates the luma offset for each pixel. In an embodiment, the luma offset calculator 720 uses the following equation (7) to obtain the luma offset bright_offset(i,j) of a target pixel b(i,j), where i is a row index and j is as a column index in the current frame 260.

$$\text{bright\_offset}(i,j) = (\text{avg}y(x,y) \times a \times e + \text{avg}y(x+1, y) \times \\ (w-a) \times e + \text{avg}y(x,y+1) \times a \times (h-e) + \text{avg}y(x+1, y+1) \times \\ (w-a) \times (h-e))/(w \times h) \quad (7)$$

/* x and y denote a region located at the coordinate (x,y) of the current frame 260 */

Referring to FIG. 8B, the calculating frame is a dotted line rectangle centered at the target pixel b(i,j) and having a size of (w×h) pixels. In the above-mentioned equation (7), the luma offset calculator 720 calculates the luma offset bright_offset (i,j) of each target pixel b(i,j) according to four proportions of the four regions respectively covered by the calculating frame (or the dotted line rectangle). Next, the luma offset calculator 720 stores the luma offset bright_offset(i,j) of the target pixel b(i,j) into a remapper 730 according to the position of the target pixel b(i,j) in the current frame 260. After that, on the one hand, the remapper 730 receives the luma component yin of an input pixel yuv_in(i,j) to generate an output luma value yout according to the above-mentioned equalized transfer curve. On the other hand, the remapper 730 uses the position of the input pixel yuv_in(i,j) to retrieve its corresponding luma offset bright_offset(i,j). Next, the remapper 730 adds the output luma value yout and the luma offset bright_offset (i,i) to obtain a final luma value y1. At last, the luma remapper 730 outputs the final luma value y1 together with the original chroma component (uv) associated with the input pixel yuv_in(i,j) to generate its corresponding output pixel value yuv_o(i,j). The difference between the remapper 730 of the third embodiment and the remapper 250 of the first and second embodiments is as follows. The remapper 250 only uses the luma component yin of each input pixel to obtain the output luma value yout. By contrast, in addition to the use of the luma component yin of each input pixel, the remapper 730 uses the position of each pixel in the current frame 260 to obtain the luma offset bright_offset(i,i), and further adds the output luma value yout and the luma offset bright_offset(i,i)

to obtain the final luma value y1. It is noted that the invention is not limited to the calculating frame having a particular shape.

Figure 9:
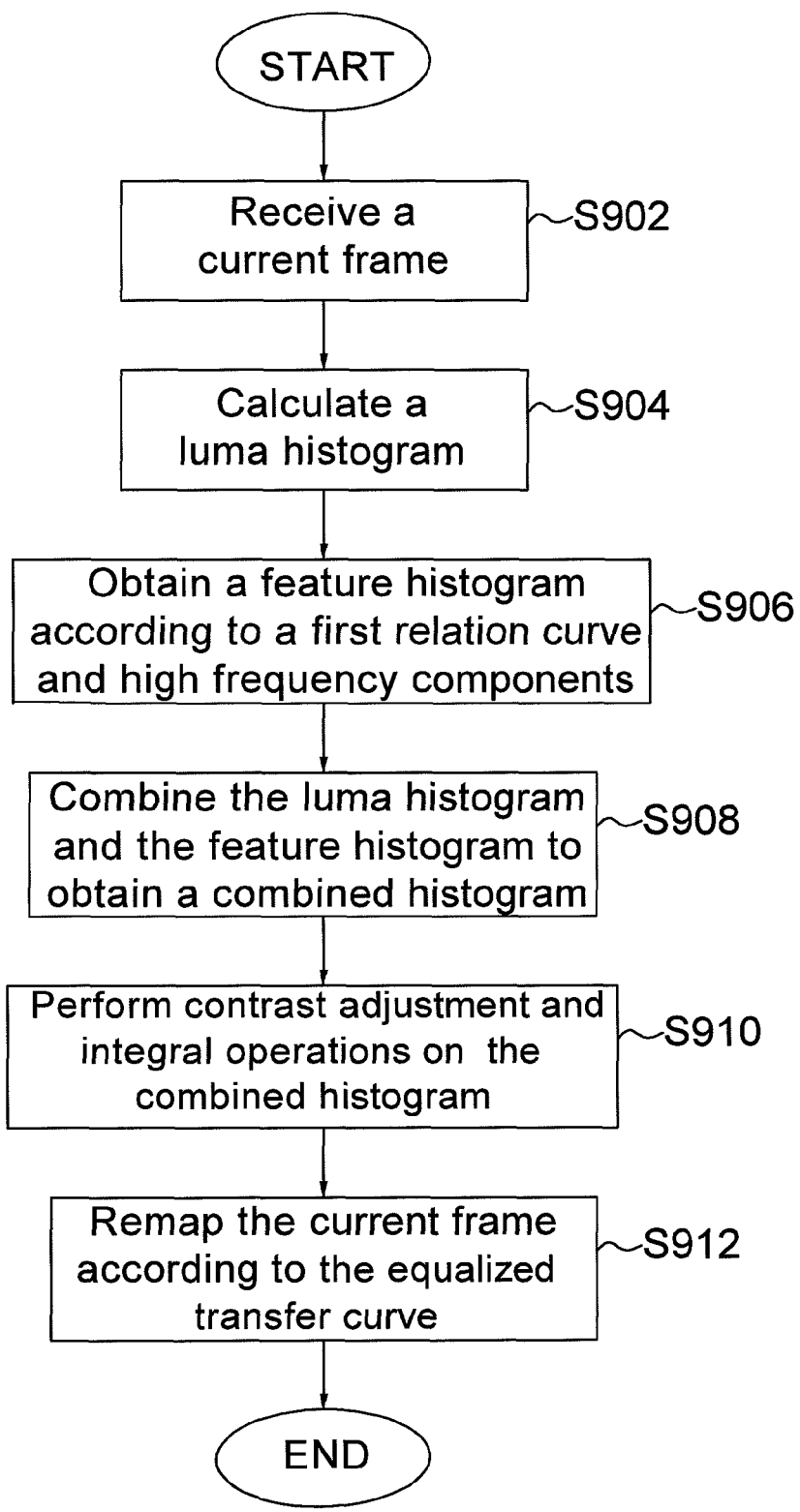
FIG. 9 is a flow chart showing a method of feature-based contrast enhancement.

FIG. 9 is a flow chart showing a method for feature-based contrast enhancement. According to an embodiment of the invention, the method of feature-based contrast enhancement is used to receive a current frame 260 and generate a contrast enhanced frame. Referring to FIG. 2 and FIG. 9, the method is detailed as follows.

Step S902: Receive a current frame 260. The current frame 260 includes a plurality of pixels, each including a luma component and a chroma component.

Step S904: Calculate a luma histogram. The histogram calculator 210 calculates the corresponding luma histogram of the current frame 260 after receiving the luma components (or data) of all the pixels of the current frame 260.

Step 906: Obtain a feature histogram according to the high frequency component of each pixel of the current frame 260 and a first relation curve (as shown in FIG. 3B). In an embodiment, the feature value calculator 220 obtains the high-pass component (h_detail or v_detail) of each pixel by applying a high-pass filter to the current frame 260, and then obtains the feature value (h_detail' or v_detail') of each pixel according to the relation curve of FIG. 3B. Accordingly, the feature value calculator 220 obtains the feature histogram.

Step 908: Obtain a combined histogram by combining the luma histogram and the feature histogram according to a second relation curve (as shown in FIG. 4) and the sum detail_sum of feature values of the feature histogram. As discussed above, the sum detail_sum of feature values of the feature histogram and the second relation curve determines the magnitude of the n value in equation (3). The magnitude of the n value determines the combining weights of the luma histogram and the feature histogram. The greater the n value, the greater the combining weight of the luma histogram. By contrast, the less the n value, the greater the combining weight of the feature histogram.

Step 910: Obtain an equalized transfer curve by performing contrast adjustment and integral operations on the combined histogram. A histogram equalizer is used to perform contrast adjustment and integral operations on the combined histogram.

Step S912: Remap the current frame 260 to obtain the contrast-enhanced frame according to the equalization transfer curve.

In sum, feature-based contrast enhancement of the invention is achieved by collecting the differences or image features between the pixels. The invention not only has the same low hardware cost as a conventional apparatus of picture-based contrast enhancement does, but also has the same advantages of suppressing background noise and enhancing image detailed features as a conventional apparatus of region-based contrast enhancement does. Therefore, the invention secures competitive advantage in the market.

What is claimed is:

1. An apparatus for dynamic contrast enhancement, comprising:
   a histogram calculator for receiving an input image to generate a luma histogram, wherein the input image includes a plurality of pixels;
   a feature value calculator for performing high-pass filtering operations over the plurality of pixels to obtain a high-frequency component for each pixel and for generating a feature value for each pixel according to its corresponding high frequency component and a first relation curve to generate a feature histogram;
   a first combining unit coupled to the histogram calculator and the feature value calculator for calculating an inverse parameter according to the sum of feature values and a second relation curve and for combining the luma histogram with the feature histogram to generate a combined histogram according to the inverse parameter;
   a histogram equalizer for receiving the combined histogram and performing contrast adjustment and integral operations to generate a equalized transfer curve; and
   a remapper for remapping the input image to generate a contrast enhanced image according to a final transfer curve;
   wherein the first relation curve is a feature value-high frequency component characteristic curve and has a maximum feature value in a middle high frequency component range and a minimum feature value in a large high frequency component range and a small high frequency component range; and
   wherein the inverse parameter is in reverse proportion to the sum of feature values according to the second relation curve.

2. The apparatus according to claim 1, wherein the number of bins in the luma histogram is equal to the number of bins in the feature histogram and the bins of the luma histogram respectively correspond to the bins of the feature histogram, and wherein when the luma histogram is combined with the feature histogram, the feature histogram is given more weight than the luma histogram as the inverse parameter decreases.

3. The apparatus according to claim 2, wherein the feature value calculator generates the feature histogram further according to the chroma component of each pixel and at least one favorite color.

4. The apparatus according to claim 3, wherein the feature value calculator generates the feature histogram further according to at least one disfavored color.

5. The apparatus according to claim 4, wherein the magnitude of the feature value contained in each bin of the feature histogram is related to the at least one favorite color, the at least one disfavored color and the high frequency components of the pixels contained in its corresponding bin of the luma histogram.

6. The apparatus according to claim 1, wherein the high frequency component of each pixel comprises at least one of a horizontal high frequency component, a vertical high frequency component and a combination of the horizontal and the vertical high frequency components.

7. The apparatus according to claim 2, wherein the sum of the feature values contained in each bin of the feature histogram is related to the high frequency components of the pixels contained in its corresponding bin of the luma histogram.

8. The apparatus according to claim 1, wherein the final transfer curve is the equalized transfer curve.

9. The apparatus according to claim 1, further comprising:
   a select unit for generating an adjusted transfer curve according to the luma histogram, a dark scene transfer curve and a user transfer curve; and
   a second combining unit coupled between the histogram equalizer, the select unit and the remapper for combining the equalized transfer curve and the adjusted transfer curve to generate the final transfer curve.

10. The apparatus according to claim 9, wherein the select unit generate the adjusted transfer curve further according the average luma value of the luma histogram and the total number of pixels of at least one pre-determined bin at dark levels in the luma histogram.

11. The apparatus according to claim 1, further comprising:

a region luma calculator for dividing the input image into a plurality of regions, calculating the average luma value of each region and generating a luma offset of each region according to a third relation curve; and a luma offset calculator coupled to the region luma calculator for generating a luma offset of each pixel according to the average luma value of each region and a predetermined size of a calculating frame.

12. The apparatus according to claim 11, wherein the remappers remaps the input image to generate a contrast enhanced image further according to the luma offsets of all the pixels and the position of each pixel in the input image.

13. A method for dynamic contrast enhancement, comprising:

calculating a luma histogram of an input image, wherein the input image includes a plurality of pixels;

performing high-pass filtering operations over the plurality of pixels to obtain a high frequency component for each pixel;

obtaining a feature histogram by generating a feature value for each pixel according to its corresponding high frequency component and a first relation curve;

calculating an inverse parameter according to the sum of feature values and a second relation curve;

combining the luma histogram with the feature histogram to obtain a combined histogram according to the inverse parameter;

performing contrast adjustment and integral operations on the combined histogram to obtain a equalized transfer curve; and remapping the input image to generate a contrast enhanced image according to a final transfer curve;

wherein the first relation curve is a feature value-high frequency component characteristic curve and has a maximum feature value in a middle high frequency component range and a minimum feature value in a large high frequency component range and a small high frequency component range; and wherein the inverse parameter is in reverse proportion to the sum of feature values according to the second relation curve.

14. The method according to claim 13, wherein the number of bins in the luma histogram is equal to the number of bins in the feature histogram and the bins of the luma histogram respectively correspond to the bins of the feature histogram, and wherein when the luma histogram is combined with the feature histogram, the feature histogram is given more weight than the luma histogram as the inverse parameter decreases.

15. The method according to claim 14, wherein the step of obtaining further comprises:

obtaining the feature histogram according to the chroma component of each pixel and at least one favorite color.

16. The method according to claim 15, wherein the step of obtaining further comprises:

obtaining the feature histogram according to at least one disfavored color.

17. The method according to claim 16, wherein the magnitude of the feature value contained in each bin of the feature histogram is related to the at least one favorite color, the at least one disfavored color and the high frequency components of the pixels contained in its corresponding bin of the luma histogram.

18. The method according to claim 13, wherein the high frequency component of each pixel comprises at least one of a horizontal high frequency component, a vertical high frequency component and a combination of the horizontal and the vertical high frequency components.

19. The method according to claim 14, wherein the sum of the feature values contained in each bin of the feature histogram is related to the high frequency components of the pixels contained in its corresponding bin of the luma histogram.

20. The method according to claim 13, wherein the final transfer curve is the equalized transfer curve.

21. The method according to claim 13, further comprising:

obtaining an adjusted transfer curve according to the luma histogram, a dark scene transfer curve and a user transfer curve; and combining the equalized transfer curve and the adjusted transfer curve to generate the final transfer curve.

22. The method according to claim 21, wherein the step of obtaining the adjusted transfer curve further comprises:

obtaining the adjusted transfer curve according to the average luma value of the luma histogram and the total number of pixels of at least one pre-determined bin at dark levels in the luma histogram.

23. The method according to claim 13, further comprising:

dividing the input image into a plurality of regions;

calculating the average luma value of each region;

obtaining a luma offset of each region according to the average luma value of each region and a third relation curve; and obtaining a luma offset of each pixel according to the average luma value of each region and a predetermined size of a calculating frame.

24. The method according to claim 23, wherein the step of remapping further comprises:

remapping the input image to generate the contrast enhanced image according to the luma offsets of all the pixels and the position of each pixel in the input image.

25. A device, comprising:

a histogram calculator for receiving an input image to generate a luma histogram, wherein the input image includes a plurality of pixels;

a feature value calculator for performing high-pass filtering operations over the plurality of pixels to obtain a high frequency component for each pixel and for generating a feature value for each pixel according to its corresponding high frequency component and a feature value-high frequency component characteristic curve; and a combining unit for obtaining an inverse parameter according to the sum of feature values and for combining the luma histogram with the feature histogram to generate a combined histogram according to the inverse parameter wherein the feature value-high frequency component characteristic curve has a maximum feature value in a middle high frequency component range and a minimum feature value in a large high frequency component range and a small high frequency component range; and wherein the inverse parameter is in reverse proportion to the sum of feature values.

26. The device according to claim 25, wherein the number of bins in the luma histogram is equal to the number of bins in the feature histogram and the bins of the luma histogram respectively correspond to the bins of the feature histogram.

27. The device according to claim 26, wherein the feature value calculator generates the feature histogram further according to the chroma component of each pixel and at least one favorite color.

28. The device according to claim 27, wherein the feature value calculator generates the feature histogram further according to at least one disfavored color.

29. The device according to claim 28, wherein the magnitude of the feature value contained in each bin of the feature histogram is related to the at least one favorite color, the at least one disfavored color and the high frequency components of the pixels contained in its corresponding bin of the luma histogram.

30. The device according to claim 25, wherein the high frequency component of each pixel comprises at least one of a horizontal high frequency component, a vertical high frequency component and a combination of the horizontal and the vertical high frequency components.

31. The device according to claim 26, wherein the sum of the feature values contained in each bin of the feature histogram is related to the high frequency components of the pixels contained in its corresponding bin of the luma histogram.

32. The device according to claim 25, wherein, according to the feature value-high frequency component characteristic curve, the feature value is set to the minimum value when the high frequency component is less than a first threshold value, wherein the feature value is set to be proportional to the high frequency component, but not greater than the maximum value when the high frequency component is less than a second threshold value and greater than the first threshold value, and wherein the feature value is set to be inversely proportional to the high frequency component , but not less than the minimum value when the high frequency component is greater than the second threshold value.

33. The device according to claim 26, wherein the inverse parameter is related to combining weights of the luma histogram and the feature histogram and wherein the feature histogram is given more weight than the luma histogram as the inverse parameter decreases.

* * * * *